Figure 1:
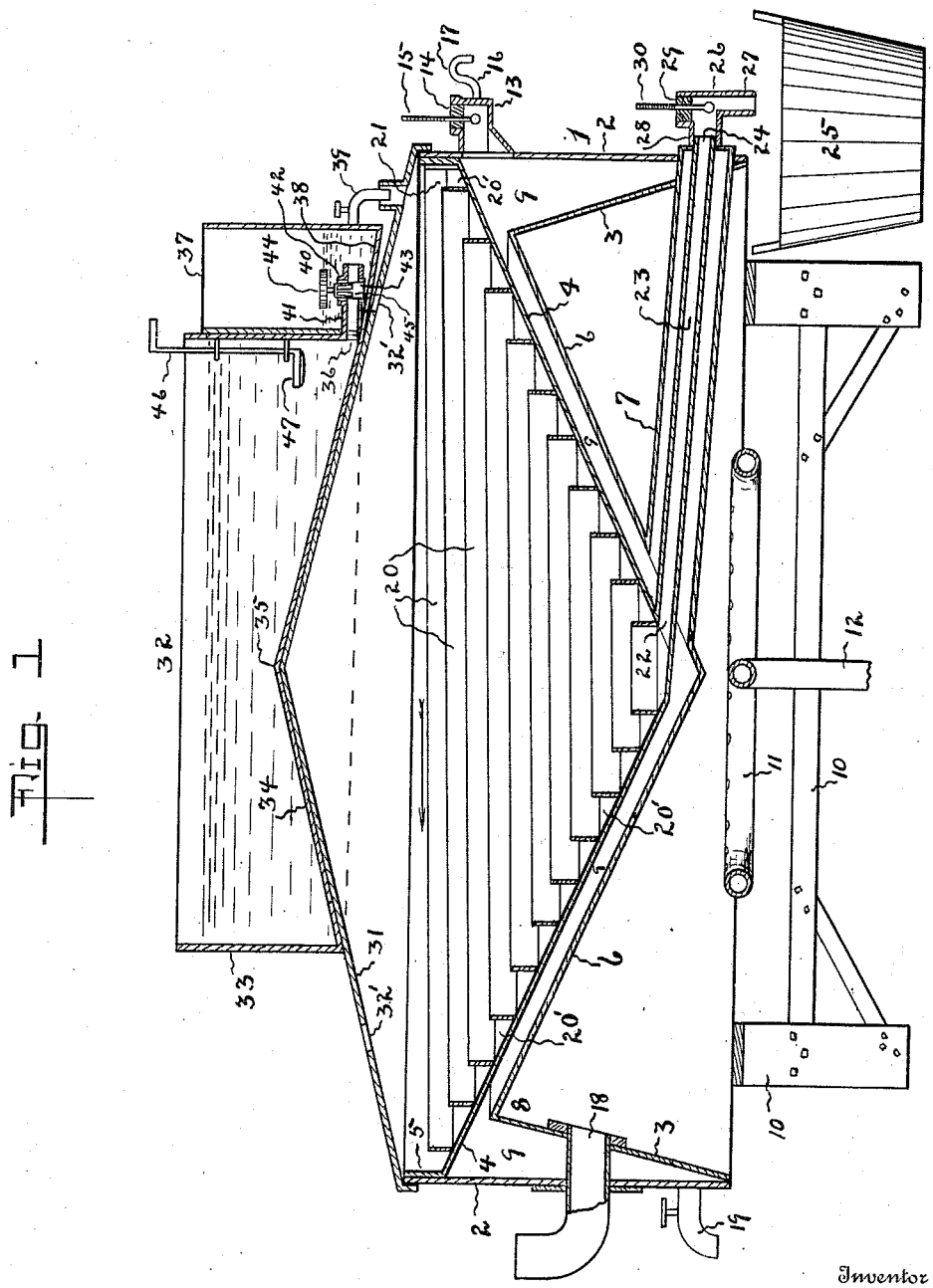

C. N. GILLE.
MILK PASTEURIZER.
APPLICATION FILED AUG. 2, 1910.

995,129.

Patented June 13, 1911.

2 SHEETS—SHEET 1.

Witnesses
George W. Cowell
J. P. Hoyt

Inventor
Charles N. Gille,
By Hiram A. Sturges,
Attorney

C. N. GILLE.
MILK PASTEURIZER.
APPLICATION FILED AUG. 2, 1910.
995,129.
Patented June 13, 1911.
2 SHEETS—SHEET 2.
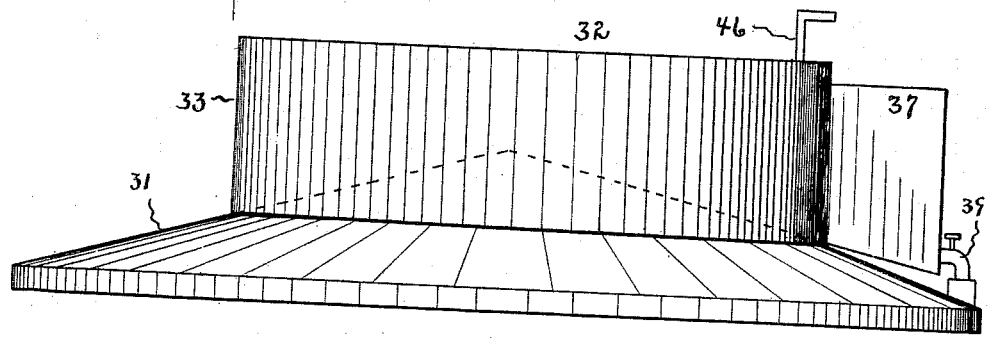
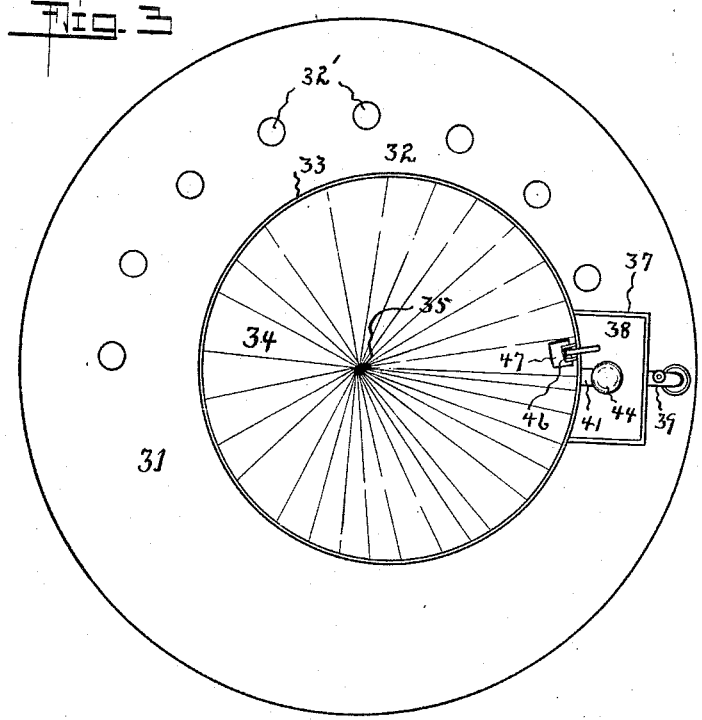
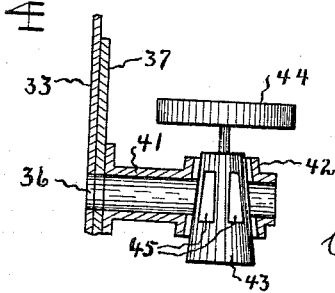
Witnesses
George W. Covell
J. P. Hoyt.
Inventor
Charles N. Gille,
Hiram A. Sturges,
By
Attorney

UNITED STATES PATENT OFFICE.

CHARLES N. GILLE, OF OMAHA, NEBRASKA, ASSIGNOR TO GRAVITY PASTEURIZER COMPANY, OF OMAHA, NEBRASKA, A CORPORATION.

MILK-PASTEURIZER.

995,129.  Specification of Letters Patent.  Patented June 13, 1911.

Application filed August 2, 1910. Serial No. 575,067.

*To all whom it may concern:*

Be it known that I, CHARLES N. GILLE, a citizen of the United States, residing at Omaha, in the county of Douglas and State of Nebraska, have invented certain new and useful Improvements in Milk-Pasteurizers, of which the following is a specification.

This invention relates to an improvement in milk pasteurizers, and has for its object to provide means convenient in use and which, while comprising few parts, will be effective in operation and may be economically constructed.

The invention has reference particularly to the form of the water jacket, to milk passage-ways, and to the form of the fire box or chamber, whereby the milk may be very quickly heated.

Milk is pasteurized by subjecting it to a heat of substantially 160 degrees while passing over a water-heated surface, the water having a temperature of 185 degrees. The feeding of the milk must be uniform, and the milk, of course, must be protected from burning. It should be pasteurized as soon as convenient after being drawn from the cow. Immediately after the milk leaves the pasteurizer it is subjected to a cooling process, ready for delivery. Since it is desirable that the delivery of milk be as early as possible after being drawn from the cow, it follows that pasteurization should be accomplished with as little loss of time as possible.

One of the objects of the invention, therefore, is to provide a means whereby this work may be speedily effected.

Another object is to provide parts which may be conveniently assembled or disassembled, and the provision of an inclined, spiral heating trough for milk, so arranged that it will be accessible for cleansing or scouring.

With these and other objects in view the invention consists of the novel features, and their combination and arrangement, as described herein, pointed out by the appended claims and as illustrated in the accompanying drawing, it being understood that changes in form, size, proportion and minor details may be made within the scope of the claims, without departing from the spirit or sacrificing any of the advantages of the invention.

In the drawing, Figure 1 is a vertical, side view in longitudinal section of a milk pasteurizer, embodying my invention. Fig. 2 is a vertical, side view of the cover, and feeding tank mounted thereon. Fig. 3 is a plan view of the milk pasteurizer. Fig. 4 is a detail relating to Fig. 1 to clearly show the construction of the valve for regulating the feed.

Referring now to the drawing for a more particular description, numeral 1 indicates a water jacket or receptacle, preferably constructed of sheet metal; it has a vertical, cylindrical, outer wall 2, connected at its lower edge with the inner, annular wall 3, said inner wall extending upwardly and inclined inwardly of wall 2. The upper surface of the water jacket or its upper containing wall is indicated at 4; it has the contour of an inverted cone, or funnel-shaped, its upper, circular edge 5 being secured to the upper part of wall 2. At 6 is indicated the lower containing wall or bottom of the water jacket; it is also formed in the shape of an inverted cone; it has a less diameter than, and is preferably disposed parallel with wall 4, its outer edge connecting with the upper edge of wall 3; and I provide the housing-tube 7 extending, downwardly-inclined from the bottom of wall 6 to and traversing walls 2 and 3, the construction thus described providing a receptacle 8 having a containing-chamber 9 adapted to contain water for heating purposes.

At 10 is indicated a suitable frame, upon which the water jacket may be seated; and, supported in any convenient manner adjacent the lower, downwardly-convergent wall or bottom 6 of the water jacket is tubular burner 11, preferably of circular form, its supply pipe being indicated at 12.

Mounted upon wall 2 and opening upon the upper part of chamber 9 is a water intake or casing 13, having a removable closure plug 14, a thermometer 15 being supported thereby for ascertaining the temperature of the heated water; and I provide the overflow or vent tube 16 communicating with the intake, this tube preferably being curved upwardly at 17 to provide an exit way substantially level with the upper extremity of chamber 9.

At 18 mounted upon and substantially midway between the upper and lower edges of wall 3 is indicated a smoke pipe, the same passing outwardly and traversing the lower part of chamber 9 and wall 2 of the water jacket; and at 19 is shown a draw-off cock.

The water jacket thus described provides a structure which may be manufactured at slight expense, comparatively, and by its use water may be quickly heated. Heat from the burner will be deflected from the inclined wall or bottom 6 and will pass toward wall 3, and thereby the heat from the burner is utilized to advantage. Also that part of chamber 9 between walls 4 and 6, by this construction, provides a limited containing space, and the thin sheet of water therein may be quickly heated; this description also applies to that part of chamber 9 between the downwardly-convergent walls 2 and 3; these features for heating water are desirable since they result in an economy of time and fuel.

Disposed spirally and secured upon the upper side of wall 4 of the water jacket is the upright strip 20, and it provides the inclined trough 20' for the passage of milk, the inclination being in the direction indicated by the arrow in Fig. 1, the intake and exit way for the milk being shown, respectively, at 21 and 22. Extended centrally within housing-tube 7, and thereby protected from direct fire contact is the milk conducting-tube 23 having an open outer terminal 24 exteriorly of the water jacket, its inner end communicating with the exit way 22 of the spiral trough, and as is obvious, milk by gravity will move in trough 20', when deposited therein, from its upper to its lower terminal, and may be exposed, during its passage, to the heated wall 4 of the water jacket, the milk being finally deposited in receptacle 25, the inclination of tube 23 facilitating this movement.

The speed for the movement of the milk over the heated surface will, of course, depend upon the inclination of the trough, and the construction is such that the milk will be exposed a sufficient time to attain the desired degree of heat. It is advisable in the construction to provide a limited pitch as shown in Fig. 1 for the downwardly convergent wall 4, and thereby the depth of the flowing milk in the inclined passage way 20' will be less, also a greater heating surface of wall 4 may thereby be utilized, than would be the case if a greater pitch was employed for said wall.

Upon the terminal 24 of tube 23 is removably mounted a testing receptacle 26. It has an exit tube 27, and a sleeve 28, the latter adapted to have a seating upon the terminal of tube 23, and it is provided with plug 29 having a thermometer 30 seated therein, whereby the degree of heat of the milk which passes from the device may be ascertained.

In the operation of pasteurizing milk a thin coating will form upon the heated passageways, also it will form within tube 23 and testing receptacle 26. It is necessary that these deposits be removed upon each occasion of their use. It will be seen from the construction as described that the spiral trough and its connections are accessible for the purpose of scrubbing, scalding and rinsing, and at this time, receptacle 26 may be removed from its seating, plug 29 also being removed, and a reamer and swab are generally used for cleaning the interior of tube 23.

I provide the cone shaped hood or cover 31, which may be removably seated upon the water jacket, whereby the heat may be retained and the milk passageways kept clean, and the hood is provided with a plurality of vent openings, indicated at 32'. By reason of its conical form the cover may have a strength adequate to support the weight of devices mounted thereon, now to be described.

At 32 is indicated a milk tank adapted to have a removable seating upon cover 31. It is formed as a circular, vertical casing 33 with an upwardly convergent bottom 34. The degree of convergence or pitch of the bottom is uniform, and corresponds to the pitch of the cover 31. Casing 33 is not uniform in width, however, and the point of convergence 35 of the bottom, therefore is not at the middle of the tank. This is a desired construction, since, when the milk tank is seated upon the cover, the convergent terminals of cover 31 and bottom 34 being coincident, that part of casing 33 of the tank having the greatest width may be disposed adjacent to intake 21, the aperture therefor being formed in and near the edge of the cover, and thereby the tank may be conveniently drained, that is to say, the entire contents of the tank may pass its exit aperture 36 without changing the position of any of the parts.

I provide the regulating tank 37 having vertical walls and preferably secured rigidly to that part of casing 33 having the greatest width. It is provided with a bottom 38 inclined downwardly and outwardly from casing 33, and with a spigot 39 normally remaining open. In order that the flow of milk may be uniform which passes upon spiral trough 20' from tank 32, I provide the regulating device 40. Exit aperture 36 is formed at the lower part of casing 33, being that part of the milk tank having the greatest depth, and, communicating with this aperture interiorly of tank 37 is tubular stem 41 having the valve-housing 42 mounted upon its free end, and within housing 42 may be seated the valve 43 having a float 44 secured upon its upper end. The valve is formed as a casing, tapered from its base to its upper end, said upper end having longitudinal apertures 45 formed therein, and the device thus described will operate to provide a uniform flow of milk whether tank 32 is entirely or partly filled. During operation, milk will flow within the regulating tank from tank 32 until float 44, on account of its buoyancy, will elevate the valve, so that apertures 45 will be disposed above and out of alinement with the bore of tube 41, and the flow thereupon will cease.

Valve or spigot 39 remains open during operation, and it has a less capacity as a passageway than tube 41 and its connected parts. As soon as the supply in the regulating tank has been reduced, float 44 will be lowered, thereby lowering or "opening" valve 43, the result being that the liquid contents of the regulating tank will be uniform, and the flow of milk within trough 20' will be regular.

The apparatus for handling and pasteurizing the milk thus described is very convenient, the operator simply exercising a care to provide a requisite degree of heat for the water and milk, indicated by thermometers 15 and 30. Care must be exercised at this time, of course, to prevent milk tank 32 from becoming empty, and as a visible indicator, vertical stem 46 connected with float 47 and mounted slidably within the milk tank may be useful for this purpose.

It will be understood that the device would be operative if chamber 9 was strictly funnel-shaped, and formed simply by use of the two parallel upper and lower sheet-walls 4 and 6, the downwardly-extending, circumferential part of the chamber being dispensed with. In such construction, however, a considerable amount of heat would be lost by radiation, heat being directed upon wall 2. It will be seen that the outermost part of chamber 9, just referred to, conserves the heat and causes it to be employed for water heating purposes, and practically no heat is lost by radiation.

Having fully described my invention, what I claim and desire to secure by Letters Patent is,—

1. A pasteurizing apparatus, comprising a first funnel shaped receptacle provided with a transverse housing-tube; a second funnel shaped receptacle disposed adjacent to and above the first receptacle and provided with a spiral, upright strip to form an inclined, open passageway, and having a conducting tube disposed within the housing tube of the first receptacle; and means for heating said first receptacle.

2. An apparatus for the purpose described, comprising a funnel-shaped water jacket, having an upright, circumferential containing-chamber disposed below its outer edge; means for heating the water jacket and chamber; a spiral partition mounted upon the upper side of said water jacket and containing-chamber and providing an inclined passage way; and a conducting-pipe traversing transversely said upright circumferential containing-chamber and communicating with said passage way.

3. In devices for the purpose described, the combination with a water receptacle having a cylindrical side wall and a downwardly convergent containing wall, of a secondary containing wall disposed below and having its middle part disposed substantially parallel with said downwardly convergent containing wall, said secondary wall being provided with a transverse circumferential wall connected with the lower edge of said cylindrical side wall; a spiral partition secured upon said downwardly convergent containing wall and providing an inclined, open, curved milk-passage-way extending substantially from its edge to its middle; means for heating said water receptacle; means for regulating the flow of milk upon said passage-way; temperature-testing means in communication with said water receptacle; a conducting pipe having an exit port exteriorly of the water receptacle and communicating with said milk-passage-way, and temperature-testing means in communication with said conducting pipe.

4. In combination, an apparatus for the purpose described, comprising a funnel-shaped water jacket having a part of its body provided with adjacent, substantially-parallel upper and lower containing walls; heating means and temperature-testing means for said water jacket; an upright, metallic, spirally-formed strip secured upon the upper wall of the water jacket and providing an inclined milk-passage-way; a conducting pipe provided with a tubular housing and in communication with said milk-passage-way, its free end being provided with temperature-testing means; an apertured cone-shaped hood overhanging said milk-passage-way and supported by said water jacket; a milk tank having an exit port, a cylindrical side wall and provided with a cone-shaped bottom, the converging point of said bottom being between its center and circumference, said milk tank adapted to have a seating upon said hood, their convergent terminals being coincident; and a regulating tank in communication with the exit port of the milk tank and provided with an exit port communicating with said milk-passage-way.

In testimony whereof I have affixed my signature in presence of two witnesses.

CHARLES N. GILLE.

Witnesses:
HIRAM A. STURGES,
ARTHUR H. STURGES.

Copies of this patent may be obtained for five cents each, by addressing the "Commissioner of Patents, Washington, D. C."